(12) United States Patent
Van de Pol

(10) Patent No.: US 10,600,449 B2
(45) Date of Patent: *Mar. 24, 2020

(54) SYSTEM AND METHOD FOR REPRESENTING LONG VIDEO SEQUENCES

(71) Applicant: Visible World, LLC, Philadelphia, PA (US)

(72) Inventor: Erik Van de Pol, South Orange, NJ (US)

(73) Assignee: VISIBLE WORLD, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,113

(22) Filed: Mar. 30, 2018

(65) Prior Publication Data

US 2019/0035432 A1     Jan. 31, 2019

Related U.S. Application Data

(62) Division of application No. 12/426,899, filed on Apr. 20, 2009, now Pat. No. 9,953,681.

(Continued)

(51) Int. Cl.
    *G11B 27/34*      (2006.01)
    *G06F 16/738*      (2019.01)
    (Continued)

(52) U.S. Cl.
    CPC .......... *G11B 27/34* (2013.01); *G06F 16/739* (2019.01); *G11B 27/105* (2013.01); *H04N 5/783* (2013.01);

(Continued)

(58) Field of Classification Search
None
See application file for complete search history.

(56) References Cited

U.S. PATENT DOCUMENTS

| 5,388,197 A | 2/1995 | Rayner |
| 5,471,577 A | 11/1995 | Lightbody et al. |

(Continued)

FOREIGN PATENT DOCUMENTS

| GB | 2374748 A | 10/2002 |
| JP | 06-086210 | 3/1994 |

(Continued)

OTHER PUBLICATIONS

International Search Report and Written Opinion of the International Searching Authority, dated Jun. 3, 2009, from counterpart foreign application PCT/US2009/041161, International Filing Date Apr. 20, 2009.

(Continued)

*Primary Examiner* — Yingchun He
(74) *Attorney, Agent, or Firm* — BakeHostetler

(57) ABSTRACT

Systems and procedures for transforming video into a condensed visual representation. An example procedure may include receiving video comprised of a plurality of frames. For each frame, the example procedure may create a first representation, reduced in one dimension, wherein a visual property of each pixel of the first representation is assigned by aggregating a visual property of the pixels of the frame having the same position in the unreduced dimension. The example procedure may further form a condensed visual representation including the first representations aligned along the reduced dimension according to an order of the frames in the video.

20 Claims, 9 Drawing Sheets

Related U.S. Application Data

(60) Provisional application No. 61/046,315, filed on Apr. 18, 2008.

(51) Int. Cl.

| | | |
|---|---|---|
| *H04N 21/44* | (2011.01) | |
| *H04N 21/432* | (2011.01) | |
| *H04N 5/783* | (2006.01) | |
| *G11B 27/10* | (2006.01) | |

(52) U.S. Cl.
CPC ... *H04N 21/4325* (2013.01); *H04N 21/44008* (2013.01)

(56) References Cited

U.S. PATENT DOCUMENTS

| | | |
|---|---|---|
| 5,634,020 A | 5/1997 | Norton |
| 5,701,383 A | 12/1997 | Russo et al. |
| 5,835,163 A | 11/1998 | Liou et al. |
| 6,549,245 B1 | 4/2003 | Lee et al. |
| 7,016,420 B1 | 3/2006 | Kagechi et al. |
| 2002/0122659 A1 | 9/2002 | McGrath et al. |
| 2002/0157112 A1 | 10/2002 | Kuhn |
| 2003/0016254 A1 | 1/2003 | Abe |
| 2003/0063130 A1 | 4/2003 | Barbieri et al. |
| 2005/0185823 A1 | 8/2005 | Brown et al. |
| 2005/0248589 A1 | 11/2005 | Alpha et al. |
| 2006/0120624 A1 | 6/2006 | Jojic et al. |
| 2007/0174774 A1* | 7/2007 | Lerman ............... G11B 27/034 715/723 |
| 2007/0253699 A1 | 11/2007 | Yen et al. |
| 2009/0115901 A1 | 5/2009 | Winter et al. |
| 2009/0195392 A1 | 8/2009 | Zalewski |
| 2009/0262141 A1 | 10/2009 | Van De Pol |

FOREIGN PATENT DOCUMENTS

| | | |
|---|---|---|
| JP | 10-503341 | 3/1998 |
| JP | 2001-094990 A | 4/2001 |
| JP | 2004-508757 | 3/2004 |
| JP | 2007-536812 | 12/2007 |
| JP | 2011-518522 | 6/2011 |
| WO | 96/03840 A1 | 2/1996 |

OTHER PUBLICATIONS

"Intraframe Compression Techniques" downloaded @http://web.archive.org/web/20061118215419/http://www.newmediarepublic.com/dvideo/compression/adv06.html, available online since 2006.

* cited by examiner

SYSTEM AND METHOD FOR REPRESENTING LONG VIDEO SEQUENCES

CROSS REFERENCE TO RELATED APPLICATIONS

This application is a divisional of U.S. patent Ser. No. 12/426,899 filed Apr. 20, 2009, which claims priority to U.S. Provisional Patent Application 61/046,315, filed Apr. 18, 2008, the entirety of which is incorporated by reference.

TECHNICAL FIELD

The invention relates generally to methods and systems for representing long video sequences, and in particular to methods and systems for condensing color information of a sequence of video frames for generating a representation of the sequence of video frames.

BACKGROUND

Some systems that analyze video recordings allow forward and backward navigation within the recording. The most elaborate of those systems even allow single stepping through video frames. In the case where the recordings are long, the task of keeping an overview of the position inside the video recording becomes challenging. A user can easily lose track of where they are, relative, for example, to the beginning of the recording. Thus, navigation within the recording would be easier if video analyzing systems could allow the user to identify the location of the frame he is analyzing, within the entirety of the recording and additionally allows the user to identify scene or material transitions within the recording.

Existing systems that analyze recordings with multiple difference segments aid the user in recognizing a specific segment by displaying, for example, a sequence of representative frames at the segment transition points, i.e. the beginning of each segment. For example, for a McDonald's commercial within a video recording, the system would display one or more frames of the commercial with the McDonald's logo that would help the user recognize that the following segment is a McDonald's commercial. Therefore, these header frames provide a summary of the following video segment. A full frame is displayed and it is recognizable.

SUMMARY

For example, example embodiments of the present invention may provide procedures for transforming video into a condensed visual representation. Such procedures may include receiving video having a plurality of frames, each frame having a plurality of pixels arranged in rows and columns; for each frame, creating a first representation, reduced in one dimension, wherein a visual property of each pixel of the first representation is assigned by aggregating a visual property of at least one pixel of the frame having a corresponding position in the unreduced dimension, and forming a condensed visual representation including the first representations aligned along the reduced dimension according to an order of the frames in the video.

Example procedures may also include reducing the first representations in the unreduced dimension by grouping the pixels of each first representation into a predetermined number of blocks, along the unreduced dimension, and replacing the pixels of each block with a pixel assigned by aggregating the visual property of each pixel in the block.

In some example procedures, the predetermined number of blocks may be received as a user selection.

In some example procedures, the predetermined number of blocks may be automatically determined based on one of a dimension of the frames, an amount of visual information contained in each frame, and a visual characteristic of the video.

In some example procedures, an equal number of pixels may be grouped into each block.

In some example procedures, an unequal number of pixels may grouped into each block. In such example procedures blocks containing pixels from a center of each first representation may contain fewer pixels than blocks containing pixels from an outside of each first representation.

In some example procedures, aggregating the visual property of each pixel in the block may include averaging a color of each pixel in the block.

In some example procedures, each first representation may be reduced in a horizontal dimension.

In some example procedures, each first representation may be reduced in a vertical dimension.

In some example procedures, each first representation may be one pixel wide in the reduced dimension.

In some example procedures, a first representation may be created for a group of two or more frames.

In some example procedures, metadata may be associated with each first representation in the reduced visual representation.

In some example procedures, the metadata may indicate one or more of an average color of the pixels in the frame from which the first representation was created, a standard deviation of a color of the pixels in the frame from which the first representation was created from the average color, and a time stamp associated with the frame from which the first representation was created.

In some example procedures, a tag may be automatically generated identifying a first representation having a tagged property.

In some example procedures, aggregating a visual property of the pixels of the frame may include averaging a color of each pixel.

Other example embodiments of the present invention my provide systems for transforming video into a condensed visual representation. Such example systems may include a video condensing device; an input device in communication with the video condensing device, the input device configured to receive video comprised of a plurality of frames, each frame comprised of a plurality of pixels arranged in rows and columns; and an output device in communication with the video condensing device, the output device configured to output a condensed visual representation. The video condensing device may be configured to create a first representation reduced in one dimension, for each frame in the video; a visual property of each pixel of the first representation is assigned by aggregating a visual property of at least one pixel of the frame having a corresponding position in the unreduced dimension; and the video condensing device may be configured to align the first representations along the reduced dimension according to an order of the frames in the video to form the condensed visual representation.

In some example systems, the video condensing device may be further configured to reduce the first representations in the unreduced dimension by grouping the pixels of each first representation into a predetermined number of blocks, along the unreduced dimension, and replacing the pixels of each block with a pixel assigned by aggregating the visual property of each pixel in the block.

Some example systems may also include an interface device, wherein the interface device may be configured to receive a user selection indicating the predetermined number of blocks.

In some example systems, the video condensing device may be further configured to automatically determine the predetermined number of blocks based on one of a dimension of the frames, an amount of visual information contained in each frame, a visual characteristic of the video.

In some example systems, the video condensing device may be further configured to group an equal number of pixels into each block.

In some example systems, the video condensing device may be further configured to group an unequal number of pixels into each block.

In some example systems, blocks containing pixels from a center of each first representation may contain fewer pixels than blocks containing pixels from an outside of each first representation.

In some example systems, aggregating the visual property of each pixel in the block may comprise averaging a color of each pixel in the block.

In some example systems, each first representation may be reduced in a horizontal dimension.

In some example systems, each first representation may be reduced in a vertical dimension.

In some example systems, each first representation may be one pixel wide in the reduced dimension.

In some example systems, the video condensing device may be configured to create a first representation for a group of two or more frames.

In some example systems, the video condensing device may be further configured to associate metadata with each first representation in the reduced visual representation.

In some example systems, the metadata may indicate one or more of an average color of the pixels in the frame from which the first representation was created, a standard deviation of a color of the pixels in the frame from which the first representation was created from the average color, and a time stamp associated with the frame from which the first representation was created.

In some example systems, the video condensing device may be further configured to generate a tag identifying a first representation having a tagged property.

In some example systems, aggregating a visual property of the at least one pixel of the frame may include averaging a color of each pixel.

Other example embodiments of the present invention may provide for articles of manufacture which may include a computer readable medium containing a plurality of machine-executable instructions, which, when executed by a computer are configured to cause the computer to receive video comprised of a plurality of frames, each frame comprised of a plurality of pixels arranged in rows and columns; for each frame, create a first representation, reduced in one dimension, wherein a visual property of each pixel of the first representation is assigned by aggregating a visual property of the pixels of the frame having a corresponding position in the unreduced dimension; and form a condensed visual representation comprising the first representations aligned along the reduced dimension according to an order of the frames in the video.

In some example articles of manufacture, the machine executable instructions may be further configured to reduce the first representations in the unreduced dimension by grouping the pixels of each first representation into a predetermined number of blocks, along the unreduced dimension, and replacing the pixels of each block with a pixel assigned by aggregating the visual property of each pixel in the block.

Other example embodiments of the present invention may include systems for transforming video into a condensed visual representation. Such example systems may include elements for receiving video comprised of a plurality of frames, each frame having a plurality of pixels arranged in rows and columns; and elements for creating a first representation reduced in one dimension, for each frame in the video. A visual property of each pixel of the first representation is assigned by aggregating a visual property of at least one pixel of the frame having a corresponding position in the unreduced dimension; elements for aligning the first representations along the reduced dimension according to an order of the frames in the video to form a condensed visual representation; and elements for outputting the condensed visual representation.

Other example systems may also include elements for reducing the first representations in the unreduced dimension by grouping the pixels of each first representation into a predetermined number of blocks, along the unreduced dimension, and replacing the pixels of each block with a pixel assigned by aggregating the visual property of each pixel in the block.

Example embodiments of the present invention may also provide for a video insertion accuracy system which may include an input device configured to receive video, the video including inserted content, and a content insertion signal; a storage device, in communication with the input device, configured to automatically record the received video and the received content insertion signal; a system for transforming the video into a condensed visual representation; a display device configured to display the condensed visual representation, and an intended insertion point indicated by the content insertion signal.

Other example systems may further include an interface device configured to receive a user indication of a location in the condensed visual representation, wherein the display device may be further configured to display a frame from the video associated with the identified location.

In other example systems the display device may be further configured to display a predetermined number of addition frames surrounding the frame in the video.

In other example systems the display device may be further configured to display an insertion error calculated from the intended insertion point and an actual insertion pointed identified based on the condensed visual representation.

In other example systems the display device may be further configured to display insertion error statistics.

BRIEF DESCRIPTION OF THE DRAWINGS

The present invention will be more readily understood from a detailed description of the preferred embodiments taken in conjunction with the following figures.

FIG. 5 shows a screenshot of available recordings displayed to a user for selection of a recording for further analysis in an example system.

DETAILED DESCRIPTION OF ILLUSTRATIVE EMBODIMENTS

Figure 1:
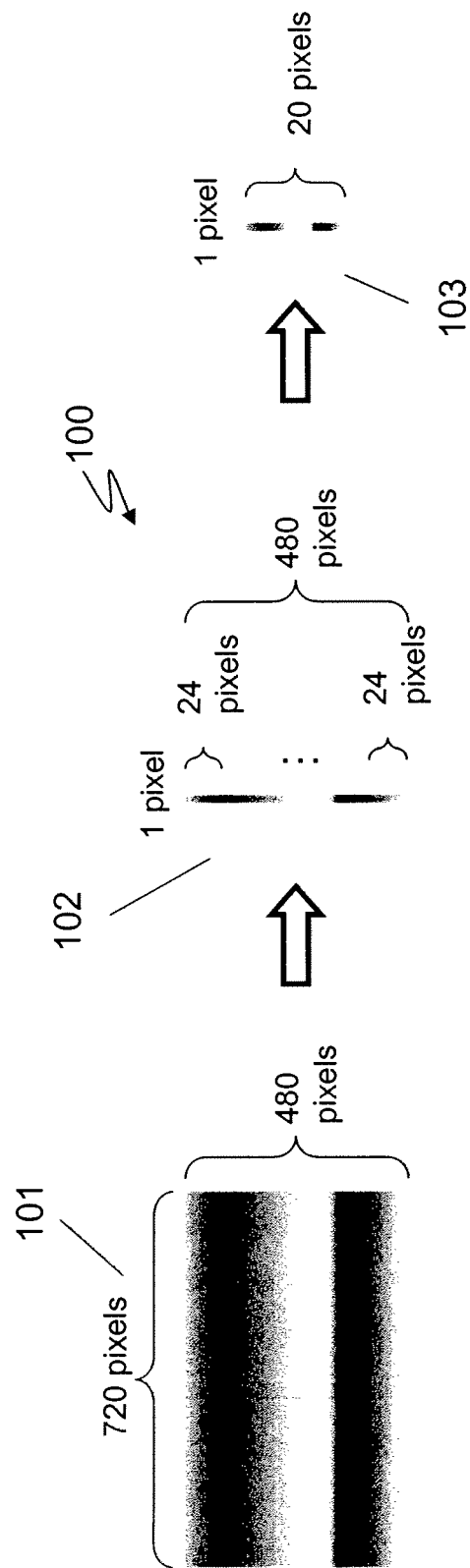
FIG. 1 shows an exemplary procedure for generating a condensed representation of a video frame.

Some example embodiments of the present invention include systems and procedures which may condense video recordings with long sequences of video frames into a representation of pixels of arbitrary length and height. In example embodiments, such video recordings can be any compressed, e.g. MPEG, or uncompressed digital video recording. In some examples, this condensed representation can be used as a visual and navigational aid in systems for analyzing video recordings by representing the characteristics of the video that would help in detecting scene or material changes in the content or in systems that perform frame accuracy analysis. In examples, such representations may be used in systems that perform video editing or any application that displays a large amount of visual information.

Example embodiments of the present invention include systems and procedures which may include generating a condensed representation by condensing each video frame of the recording in a horizontal dimension to a relatively narrow width, e.g., one pixel wide. In examples, the video frame may also be condensed in the vertical dimension to a height that may be, e.g., several pixels high. In one preferred example, each condensed video frame may have a width that is less than its height. Additionally, to achieve highly condensed representations, in some examples a frame may be condensed to a representation that is smaller than one pixel wide, e.g., multiple frames can be condensed into a single column of pixels. An example procedure 100 for generating a condensed representation of a video is presented in FIG. 1. The example procedure illustrated in FIG. 1 begins with a video frame 101, for example a 720×480 pixel video frame, which is resized to a condensed representation 103, for example, a 1×20 pixel representation. It is noted that the following example is discussed making reference to a 720×480 video frame. The present invention is, however, not limited to video frames of any particular size and the example used herein is for illustration purposes only. The example procedure illustrated in FIG. 1 may be performed in two steps. For example, the example procedure may begin with a video frame 101, which may be an array of pixels. In the illustrated example, the 720 dimension may represent the rows of the array and the 480 dimension may represent the columns of the array. In an example procedure, the first step, in generating a condensed representation 103, may include averaging the color of each pixel in every row producing a new pixel array 102 of, e.g., 1×480 pixels. The color of each pixel in the new pixel array may be the average of the color of the pixels of the row. Example procedures may proceed to further condense the representation in the other dimension. For example, an example procedure may average the color of the pixels in the 480 dimension illustrated in FIG. 1. In the example procedure shown in FIG. 1, the 480 pixels may be grouped into twenty consecutive 24-pixel blocks. In an example, the average color of the pixels in each block may be calculated and used to represent the block. For example, as shown in FIG. 1, the 1×20 pixel representation, 103, may be an aggregation of the twenty average colors that correspond to the twenty blocks.

It can be understood that the choice of breaking the 420-pixel dimension into 24-pixel blocks may be related to, e.g., the actual frame height, the amount of color information and detail the user chooses to include in the representation, as well as, the characteristics of the actual video recording. A smaller number of blocks may provide a more condensed representation and less color information. Therefore, to get a useful and meaningful condensed representation, for example, for a full high-definition recording with a frame size of 1920×1080 pixels, it may be desirable to use a greater number of blocks as compared to a recording with a frame size of 720×480 pixels. Additionally, the choice of the number of blocks may be dictated by the actual recorded content. For example, a recording with subtle scene changes and transitions, can require a greater number of blocks to provide a meaningful condensed representation compared to another recording of the same frame size, but with abrupt and distinguishable scene changes. Example embodiments, therefore, may provide a user with the option to choose among preset or user-defined block sizes. In addition, example embodiments of the present invention may automatically determine an appropriate number of blocks according to specific recording characteristics, e.g., frame size. In other examples, a user may change the number of blocks, for example, with a slider control, to generate a useful representation with appropriate color information and granularity.

In example embodiments, a different number of blocks can be selected and blocks of unequal sizes can be used. For example, video recordings tend to be focused on the center of the frame. In some examples, accordingly, an uneven distribution of pixels in the blocks may be used to produce a more meaningful condensed representation compared to one that uses equal numbers of pixels in the blocks. A user may select, for example, to have small-sized blocks in the middle of the frame and blocks with a greater number of pixels at the top and bottom parts of the frame.

In addition, although the example illustrated in FIG. 1 may use pixel color averaging to generate a pixel that represents a large number of pixels, in other examples, different and more complex aggregation algorithms than color averaging can be used to represent a number of pixels with a single pixel. In such examples, any algorithms which may condense an entire frame into a "sliver" can be used to generate the condensed representation. In addition, different algorithms may be used to emphasize different characteristics of a frame, for example, visual information of the background, or detail in the center of the frame.

Figure 2:
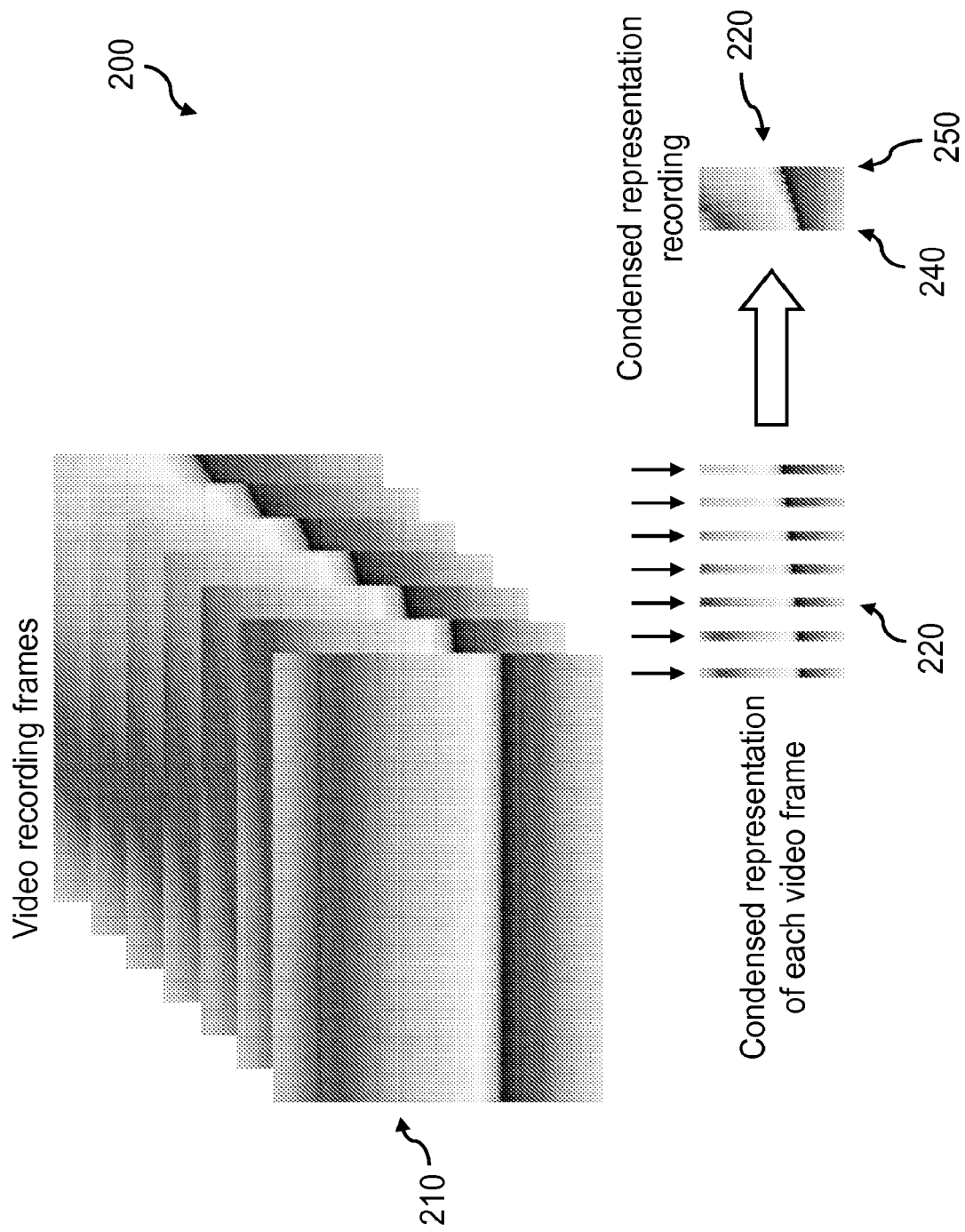
FIG. 2 shows another exemplary procedure for generating a condensed representation of a video recording.

FIG. 2 presents an example procedure 200 of generating a condensed video recording representation. In the example procedure, the video frames 210, may correspond to a video recording. To generate the condensed video recording representation, initially a condensed representation of each frame 220 may be generated, and then all the frame representations may be "stacked" side-by-side to produce a horizontally-oriented, condensed bit map representation 230 of the whole video recording. The pixel strip on the left most side 240 may correspond to the first frame and the pixel strip on the right most side 250 may correspond to the last frame. In this case, the horizontal dimension of the representation may capture vertical movement in consecutive frames. Alternatively, in other example procedures, each video frame may be condensed in the vertical dimension. In such example procedures, the condensed representations may be "stacked" in the vertical dimension to form a vertically-oriented representation of the video recording. In such an example, the vertical dimension of the representation may capture horizontal movement in consecutive frames. In example embodiments, condensed representation created may allow the temporal information of the recording, which is captured in multiple consecutive frames, to be visualized in one dimension, i.e. the horizontal dimension or the vertical dimension, as the case may be.

Figure 8:
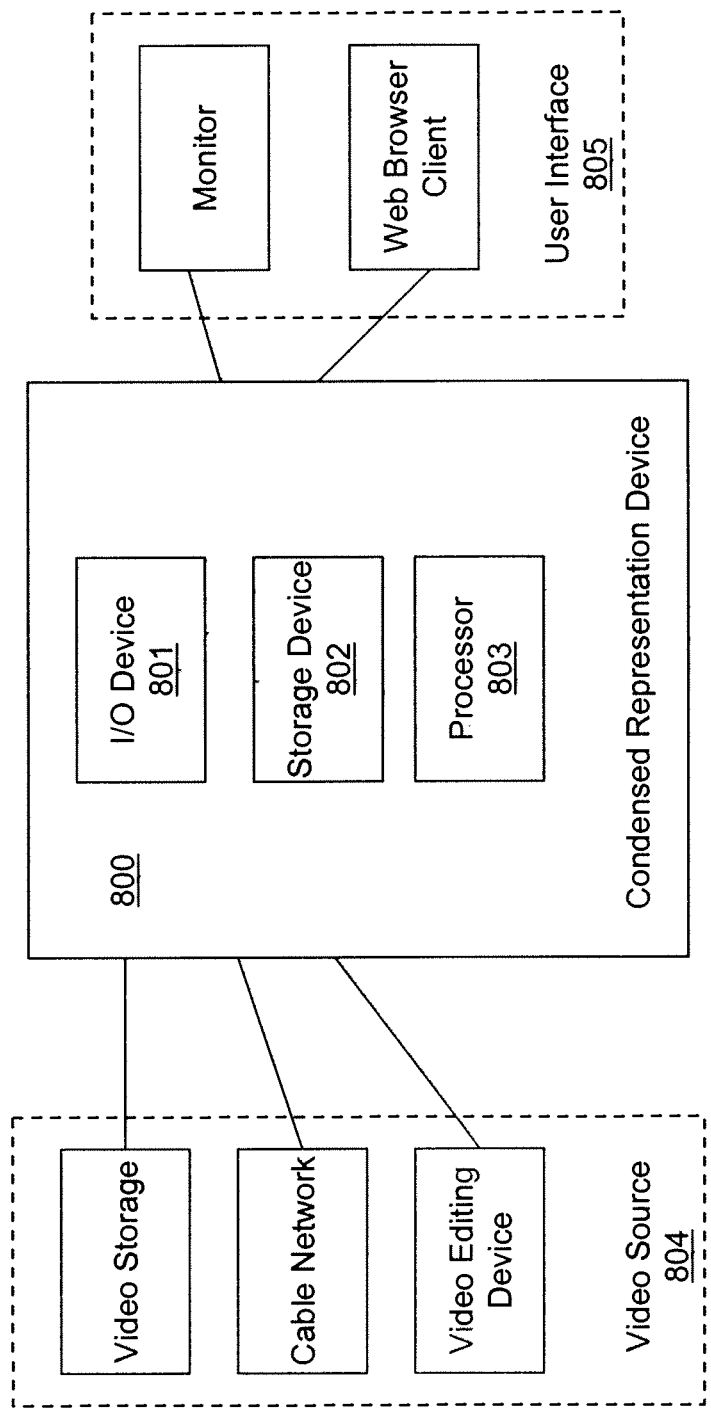
FIG. 8 shows an example system for creating condensed representations of video.

Example embodiments of the present invention may also include systems for generating a condensed representation of a video. FIG. 8 illustrates an example system 800 in accordance with an embodiment of the present invention. Such example systems may, for example, have an input device 801 capable of receiving a video input. Suitable input devices may include networking hardware, hardware to access a local or remote storage device, etc. Using such an input device, example systems may be able to receive video from a variety of sources 804, for example, as illustrated in FIG. 8, example systems may be able to receive video from video storage systems, from cable networks, and from video editing devices, as well as other sources of video. Example systems may also include a storage device for storing the received video, such as, for example, a magnetic or optical storage system.

Example systems may also include a processor 803 which may be configured to processes the video into a condensed representation, as described herein. For example, an example system may be configured to receive and store an input video signal. The example system may be able to generate a condensed representation of the video in a first dimension, for example the horizontal dimension. Example systems may also be configured to further reduce the representation created in another dimension, e.g., the vertical dimension. Once created, example systems may store the condensed representation. Example systems may also include an output device 801, which may or may not be the same device as the input device referenced above, and may be capable of outputting the condensed representation using such a device.

Example systems may also include a user interface 805. For example, such systems may include interfaces 805 which may allow users to control the creation of condensed representations. For example, example systems may include display hardware, or may include a web, or other, interface through which users may access the system. Example systems may provide users with the ability to control the condensing process through the user of such an interface 805, including the ability to choose the video to be condensed and, the manner in which the video is to be condensed, e.g., the number of blocks to use, etc. Such example systems may be capable of displaying the resulting condensed representation to users through the interface 805, and may be capable of accepting user input as to any of the other actions described herein.

In addition, other example embodiments of the present invention may provide for systems which may utilize condensed representations of video. As explained further below, such example systems may include video production and editing systems, video consumption systems, surveillance systems, and any other systems in which it may be desirable to navigate through video using a condensed representation. Of course such example systems may or may not be distinct from the systems which generate condensed representations from video.

Figure 3:
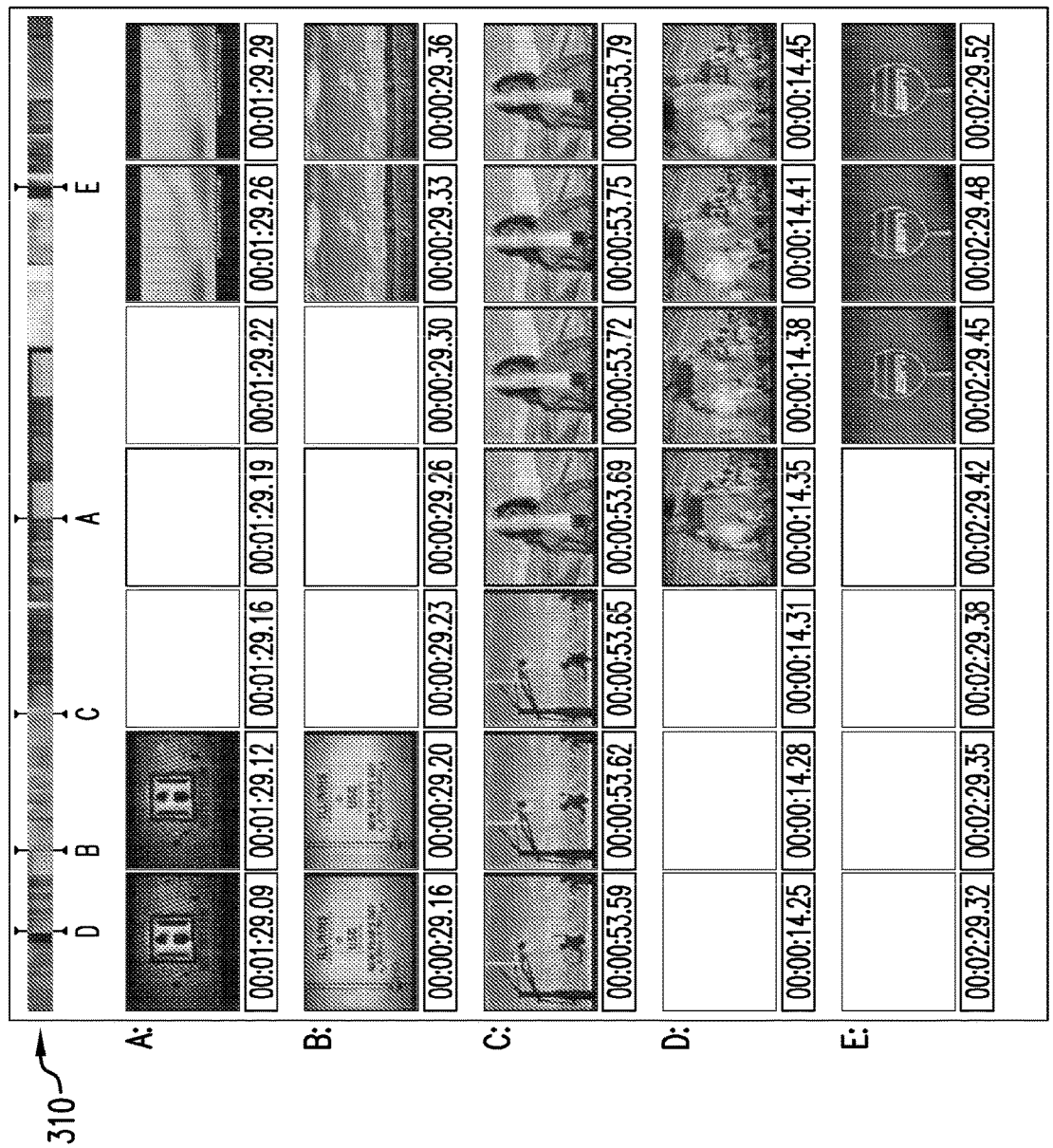
FIG. 3 shows an example of a condensed video recording representation and five different sequences of frames that relate to different points within the recording.

For example, FIG. 3 shows an example display of an example system utilizing a condensed representation of a video as discussed above. In FIG. 3 the example display depicts a 1024×20 bitmap condensed representation 310 of a three minute recording. Such an example recording may include 5396 frames and each frame may be a 720×480 pixel image. To produce the 1024×20 bitmap representation, initially a 5396-pixel wide and a 20-pixel high representation may have been generated, according to the example method described above. In the illustrated example, that representation may be resized to be 1024-pixels wide and 20-pixels high; which may mean that every 1×20 pixel representation of the bitmap corresponds to a little more than five video frames of the video recording in the example. In example embodiments, such resizing may be performed so that the condensed representation can fit conveniently on a screen. In such example embodiments, any standard resizing technique can be used. The information after condensing and resizing may help a user quickly distinguish scene transitions and other interesting changes in the source material. Of course, it is to be understood that the size of the condensed representation may be changed, as desired, to adjust visibility and according to user preferences.

The example display illustrated in FIG. 3, depicts 5 points (A, B, C, D, and E) identified in the condensed representation 310.

Point A shows a transition from a segment with red hues, to a segment with blue hues, separated by three black frames.

Point B shows a similar transition, but the color differences are more subtle. Still, it's possible to detect a transition.

Point C shows a scene cut, which is also evident in the strip chart.

Point D shows black video frames followed by start of a non-black video sequence. The transition from the black frames to the non-black ones is evident in the strip.

Point E also shows black video frames followed by start of a non-black video sequence.

As illustrated, example systems according to the present invention, may also display frames associated with points identified in a condensed representation. For example, as shown in FIG. 3 seven frames may be displayed for each point. In such example systems, a frame corresponding with an identified point may be displayed, for example, the boxed frame illustrated in the middle of each grouping in FIG. 3. In addition, the example system may also show frames surrounding the marked location. In FIG. 3, the central frame is depicted along with three frames preceding the identified frame and three frames following it. Such example systems, therefore, may allow users to quickly identify points of interest in a video through use of the condensed representation. Once such points of interest have been found, example systems may allow users to identify those points and may display the corresponding full frame from the video. In addition, example systems may allow users to see those frames in context by displaying a number of frames surrounding the frame of interest.

In example embodiments of the present invention, a system that implements the condensed representation described above may be used for example to analyze TV advertisements within broadcast TV programs. Typically advertisements appear in 30 or 60 second lengths and usually come along with distinguishable scene transitions that can be easily detected using the condensed representation disclosed. Additionally, example embodiments of the present invention may allow such condensed representations, or bitmaps, to be tagged with markers that would point to different interesting events within the recording that a user can quickly identify and to which the user may navigate. Other example embodiments may use the disclosed representation, for example, in systems for scene change analysis and scene prediction, in scene cut detection algorithms, in surveillance video tools, and in video editing systems as a navigation aid. In other example embodiments, the procedures and systems described herein may also be used in systems that perform automated functions without human supervision. For example, in example embodiments, when computing the condensed frame representations, each frame representation may be appended with corresponding metadata. Such metadata may include representative parameters of the frame, i.e. an average color of the pixels of the frame, a standard deviation from the average color, or any other characteristic and statistical parameters. In some examples, the metadata may also include time stamps specific to each frame and other information related to each corresponding frame to which they are appended. Embodiments of the present invention may utilize such metadata. For example, an example system may check for unexpected and/or unpatterned changes in such metadata, and may automatically detect unusual and/or anomalous events within a recording and may insert a flag marking such an event or may draw a user's attention to the event, e.g., in a surveillance review system.

Referring again to the example display of FIG. 3, the condensed bitmap and actual video frames can be viewed as a webpage using a standard web browser, although the representation can also be viewed within a desktop application or any application that can display video. In example embodiments, a user can click at a point on the bitmap, e.g. point A, and the actual frame that corresponds to the clicked point may be presented. Specifically, in the example, a sequence of, for example, seven frames may be displayed, which may include the frame that corresponds to the point selected on the representation and the three preceding and three following frames, as described above. In example embodiments, the number of preceding and following frames displayed may be any suitable number. In some examples, the number may be a parameter that may be changed by a user, so that the display provides appropriate local content around the clicked point.

Figure 4:
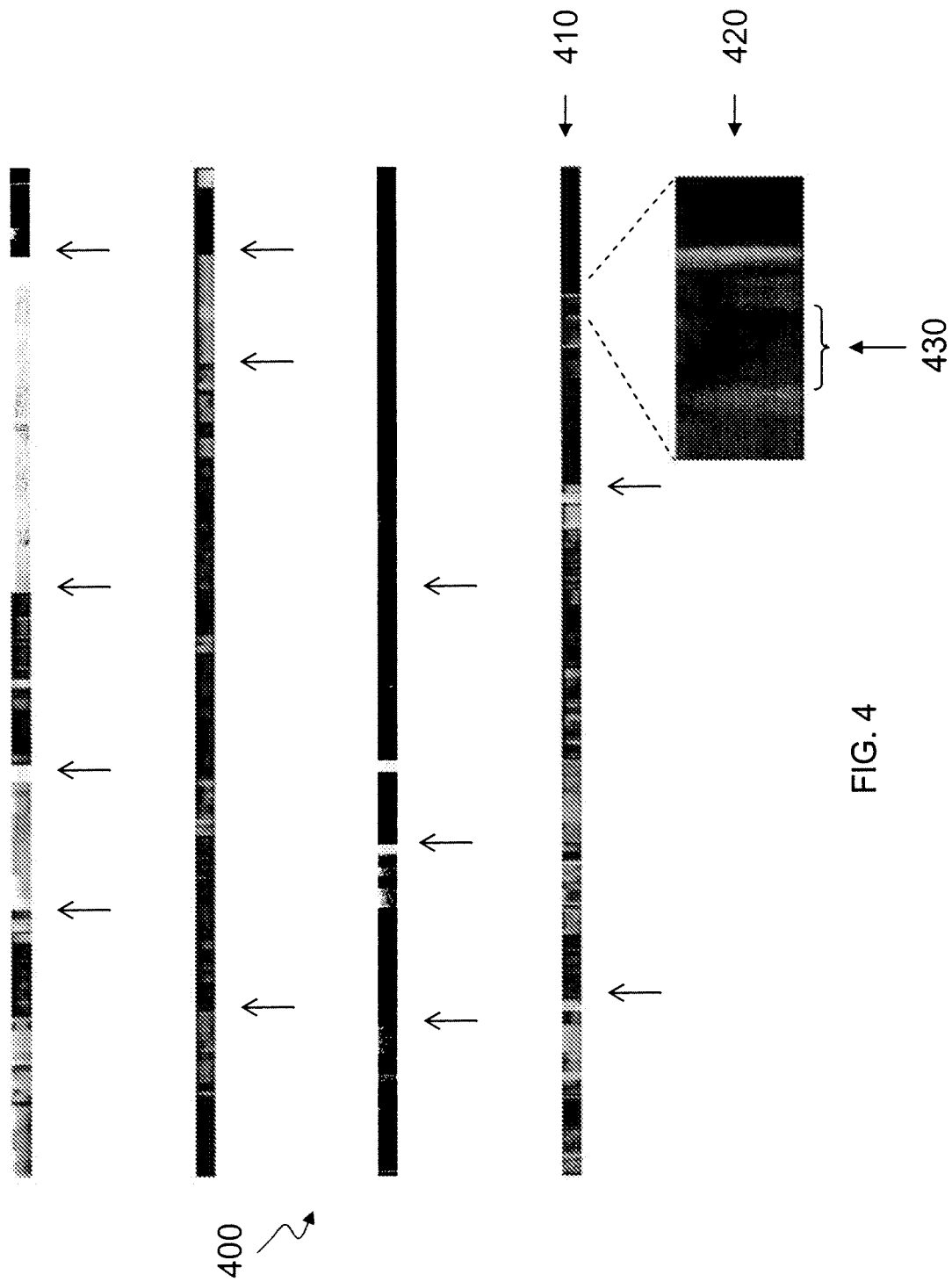
FIG. 4 shows four additional condensed bitmap representations of different video recordings.

In example embodiments of the present invention, systems and methods are provided which may allow users to identify scene changes in video, utilizing the example condensed representations discussed herein. For example, FIG. 4 shows condensed representations 400 of four different video recordings. These representations show that in a sequence of video segments, related video tends to change slowly over time. However, when a scene cut or a change of content appears in video, there is usually an abrupt change in the luminosity and the brightness of the video image. For example, in FIG. 4, some of the transitions occurring in the four condensed representations are marked with arrows. Such abrupt changes may be clearly distinguishable in condensed representations of the video. Example embodiments of the present invention may exploit such condensed representations allowing a user to detect scene cuts.

In addition, such example embodiments may also allow users to detect other features of a video. For instance, some movement that occurs over time may be detected. In FIG. 4, towards the end of the fourth strip 410, a portion of the strip has been exploded 420. It can be assumed from the condensed representation that the video depicts a large object which moves from the top part of video to the middle. Looking closely from left to right, within the exploded portion 430, it seems that the object is falling.

An example embodiment of the present invention, namely a video insertion accuracy tool provided for use in a cable television system, will now be discussed. It is, however, to be understood that such example embodiments may be capable of use in any system that uses or requires video analysis and that the present invention is not limited to either a cable network environment or the or to insertion accuracy tools.

As mentioned, some example embodiments of the present invention may provide for a video insertion accuracy tool, which may allow a user to analyze the accuracy with which content is inserted into video programming. Video insertion accuracy tools may be used in television-based systems, for example, cable or satellite systems, in online applications, and, in general, in any application and system where frame accuracy is important. In cable systems, advertisements can be inserted locally at the different cable markets. Local advertisement content can be inserted in the cable broadcast transport stream, when indicated by the cable network, for example, upon reception of a cue tone from the cable network. In practice, local advertisement insertion is an inherently inaccurate process requiring constant fine tuning by multi-system operators (MSOs) of cable television systems. In such situations, an example video insertion application tool, in accordance with example embodiments of the present invention, may be installed at such MSO locations, for instance in a cable television headend facility. Example tools may be capable of automatically recording a program for analysis. Such example system may automatically record video surrounding the insertion of local content. For example, example system may identify and record indications received from a cable network identifying appropriate insertion times of local advertisements, which are typically provided ahead of the intended times of insertion in a cable system. Example tools may receive these indications and may automatically record all of the content necessary to analyze the insertion accuracy of the locally inserted content, including both the video and the indications themselves.

Local ads are most commonly inserted into a transport stream using stream splicing. In such cases, the spliced stream may then be fed into an analysis device, in accordance with an example embodiment of the present invention. The video insertion accuracy tool may receive the output of the splicing device to record the locally inserted ads. In addition to the digital video streams, the example tool may also receive cue tones provided by the cable network which signal an upcoming local availability for an advertisement insertion. Upon reception of a cue tone, the tool may start recording the audio and video content of that particular network stream to a storage device. Typical advertisement breaks last several minutes and the recordings may cover the entire break. There is a specific agreed-upon delay between the indication coming from the network and the time when the local insertions are supposed to start, so that the insertion is synchronized. This delay is called a "preroll." Unfortunately, the preroll is not always accurate and may change, which causes synchronization problems. Different cable television systems may use different types of indication tones. It is to be understood that the example tools described are not indication tone specific, but can work with any type of indication tone and, therefore, different cable television systems.

Figure 5:
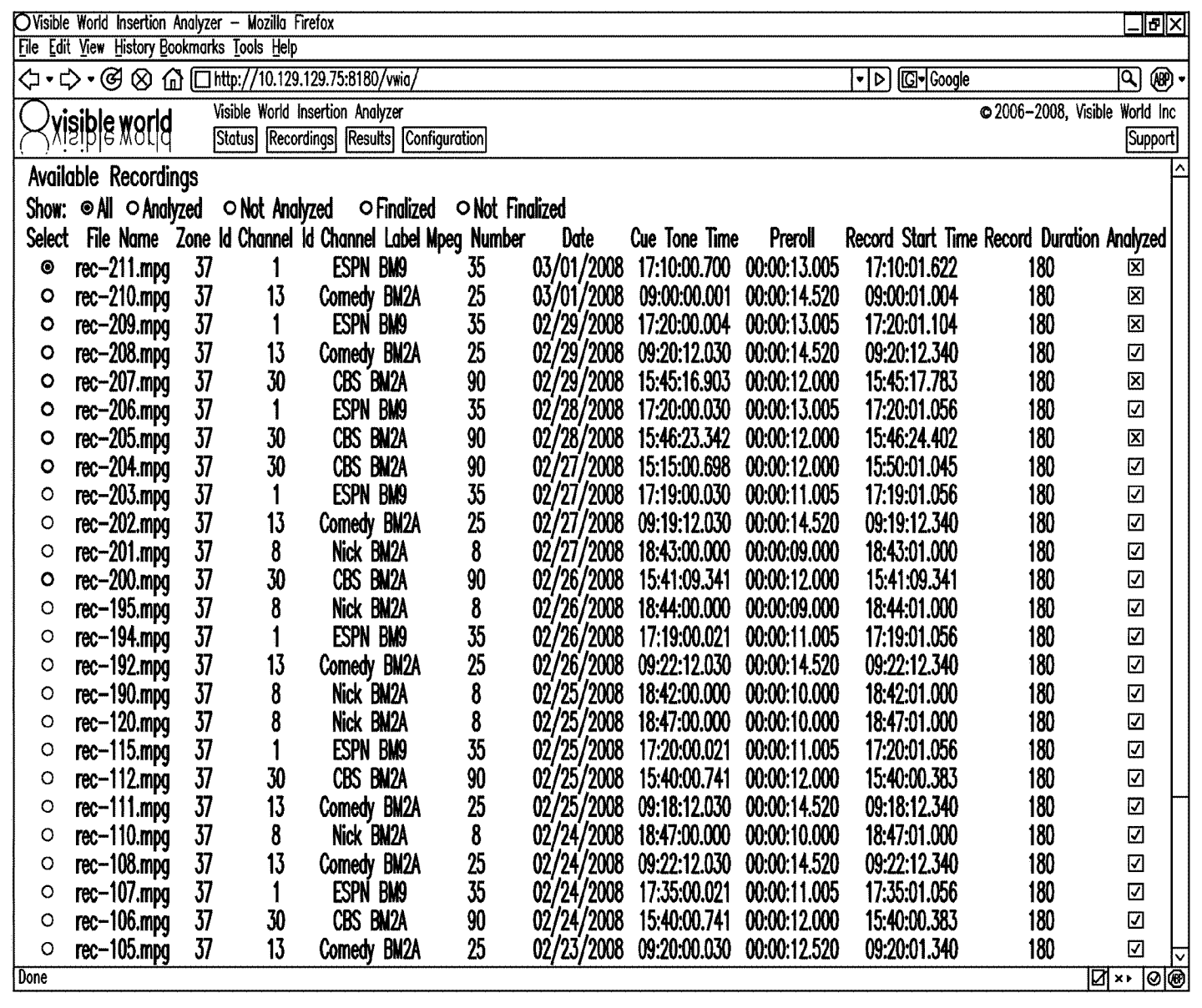

Once such information is gathered, example insertion analysis tools may allow users to examine insertion accuracy in the content. In some example embodiments, after the recordings are stored, the example tool can display a list of all the available recordings for further analysis. For example, FIG. 5 displays a screenshot 500 of available recordings that an example tool may display to a user. In example embodiments, the users may be able to select a specific recording from such a screen for further analysis. Timing information related to a selected recording may be populated by the system to aid the analysis. An operator may confirm the results of the analysis and also make the needed corrections in the recording. As illustrated in FIG. 5, example systems may display other relevant information allowing users to identify and analyze video which the system records. For instance, in the illustrated example, users may be presented with the file name of the stored recording, the zone ID, Channel ID, Channel label, Date of the recording, the time of the cue tone, the preroll, the time at which the system began to record the video segment, the duration of the recording, and a field indicating whether the particular recording has been analyzed.

Figure 6:
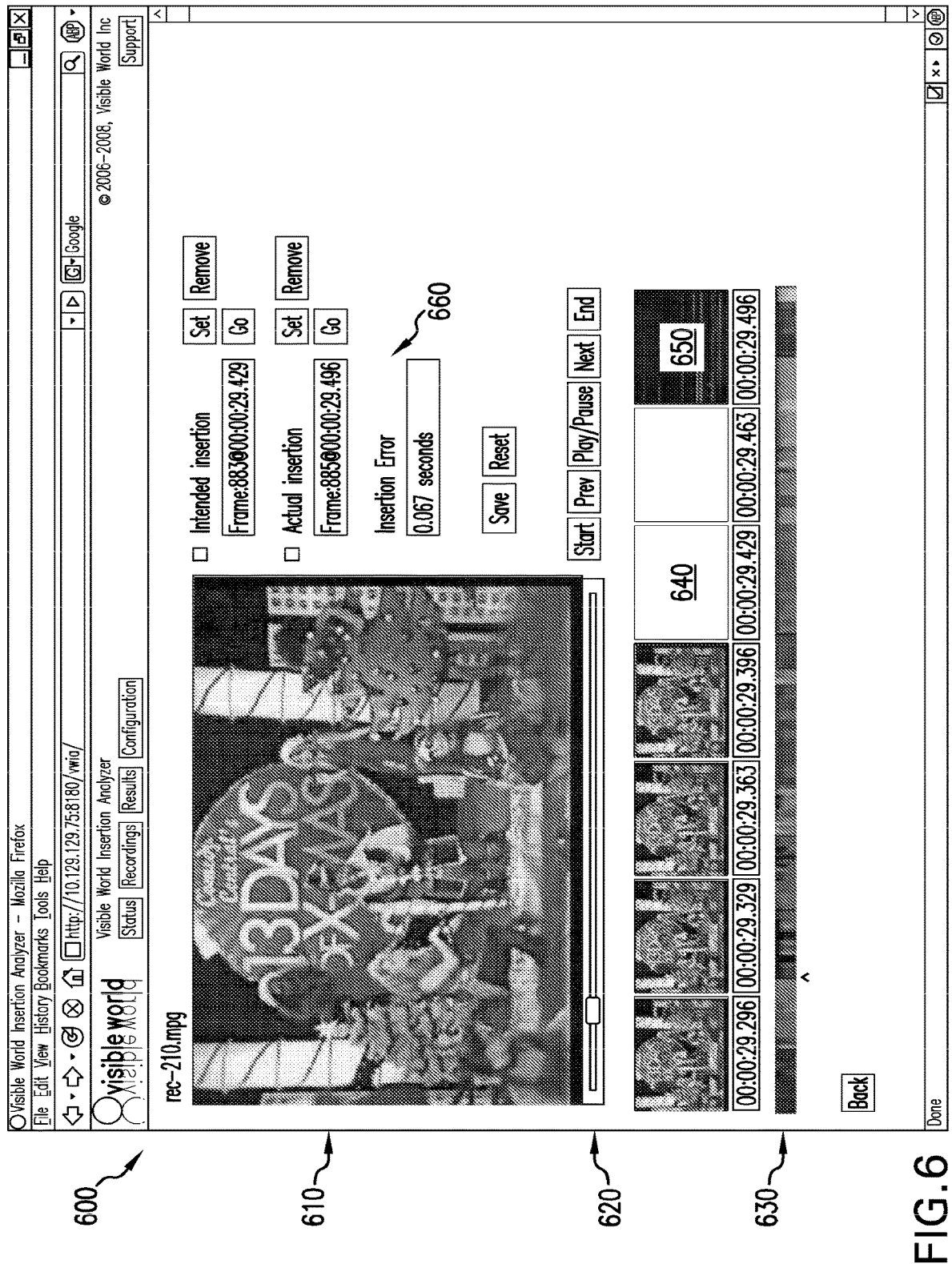
FIG. 6 shows a screenshot of an example system that displays a video recording and implements the disclosed method of condensed video representation.

After selecting a recording, in example embodiments, a user may be presented with a screen similar to the screenshot 600 shown in FIG. 6, which shows a full-screen representation of a frame 610, a navigation control which may allow a user to navigate within a video recording or a portion of the recording being displayed 620, and a visual representation of the entire recording 630 according to embodiments of the present invention. In some examples, the full-sized frames can be decoded and displayed on the fly.

Some example tools may indicate when actual insertion points take place, using timing information provided by a cable network or received from another source. Insertion errors exist when there is a difference between the intended and the actual insertion point. An example of an insertion error is shown in FIG. 6, where the actual insertion point 650 is two frames late from the intended insertion point 640. It is also possible that the actual insertion point may be earlier than intended. Example embodiments may display insertion error information. For example, FIG. 6 illustrates a screen of an example tool which provides additional information 660, e.g. frame number, insertion time, and insertion error. For example, in the example screen show in FIG. 6 the intended insertion frame number is 883 and the actual insertion frame number is 885, thus, there was a two-frame delay, which corresponds to an insertion error of 0.067 seconds.

The condensed visual representation 630, illustrated in the FIG. 6 example, which looks like a bar at the bottom of the screenshot, may help a user identify where scene cuts take place and may make it possible to quickly identify the different advertisements, or other inserted content. Scene transitions between different advertisements are easily observed, because advertisement content typically has a distinct look. Therefore different advertisements may be clearly distinguishable in the condensed representation of the recording, which may help a user navigate to the scene transitions. In example embodiments, a user may click on the condensed video representation 630, and may then preview the nearest frame that corresponds to the point clicked. In some examples, the condensed video representation for each video recording may be precomputed, according to the example processes described above, once recording is complete. In the example shown in FIG. 6, each stack of pixels in the representation bar represents a frame. The example representation may also be scaled to fit a certain width. For example, the condensed representation for the example recording of FIG. 6 may have first been created to be 5396-pixels wide and 20-pixels high. The condensed representation may have then been resized to 1024×20 pixels as shown 630 in FIG. 6. In example embodiments the condensed representation need not be displayed as a single line. Rather, the representation may be arranged in different ways, e.g. it can be arranged in several rows, for example, for a very long recording, or it can be arranged in one row as in FIGS. 3, 4, and 6. Generating the condensed representation and resizing it to fit a certain width may be performed in a two-step process as was described previously. However, it is to be understood that in other examples condensing the video sequence and resizing the condensed representation can be performed in a single step.

Figure 7:
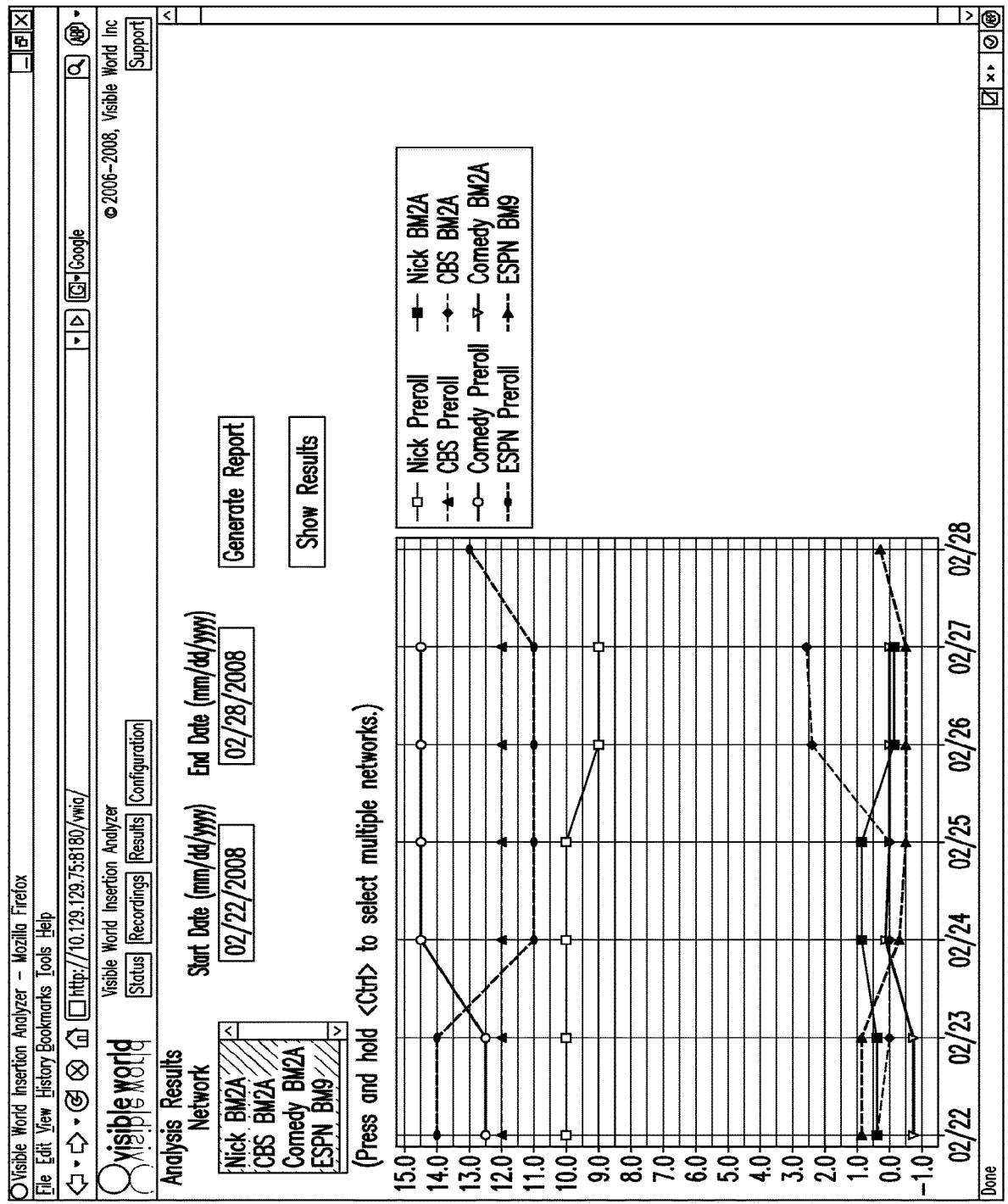
FIG. 7 shows a screenshot of an example system that provides a video insertion analyzer that can be used for guiding corrective measures to insertion errors identified in video recordings.

Example insertion analysis tool interfaces may allow for quick identification of insertion errors, like the two-frame insertion delay error discussed with regard to FIG. 6. Example embodiments may allow users to record the results of an analysis. Once the results for multiple recordings are collected, they may be further analyzed by the user. By measuring and tracking insertion errors over time, certain types of problems, for example, inaccuracies at a cable network, inaccuracies in an MSOs transport path, inaccuracies in the configuration of splicing devices, etc., can be identified. Example embodiments of the present invention may provide users with the tools necessary to conduct such an analysis. For example, FIG. 7 shows an example analysis display which may be provided by example embodiments of the present invention, which may permit users to analyze and view the results from the analysis of different recordings. Specifically, the screenshot 700 in FIG. 7 may illustrate an example tool which may allow users to graph the insertion inaccuracy for different selected networks at different days. Example embodiments may allow users to track changes in accuracy, like the ones shown, over time which may also be correlated to different events. For instance, if all networks at a particular moment fluctuate by the same insertion inaccuracy, then that points to a problem in the MSO transport infrastructure. Example embodiments of the present invention may utilize information collected about the inaccuracies at the insertion points to help guide corrective measures. Example tools may allow users to view the results of individual analyses in a variety of ways. For instance, the example shown in FIG. 7, allows users to choose a select a time period for analysis and also select a number of networks about which data is to be presented. In the example, a user has elected to view a graphs of the period from 212212008 to Feb. 28, 2008, and has chosen to present information related to the Nickelodeon, CBS, Comedy Central, and ESPN networks. Example systems may then generate and display a graph, such as the example graph illustrated, which may allow a user to identify insertion errors for the various networks, or other video sources, identified, as well as allowing users to compare errors between the sources and to view the change in various errors over time.

Figure 9:
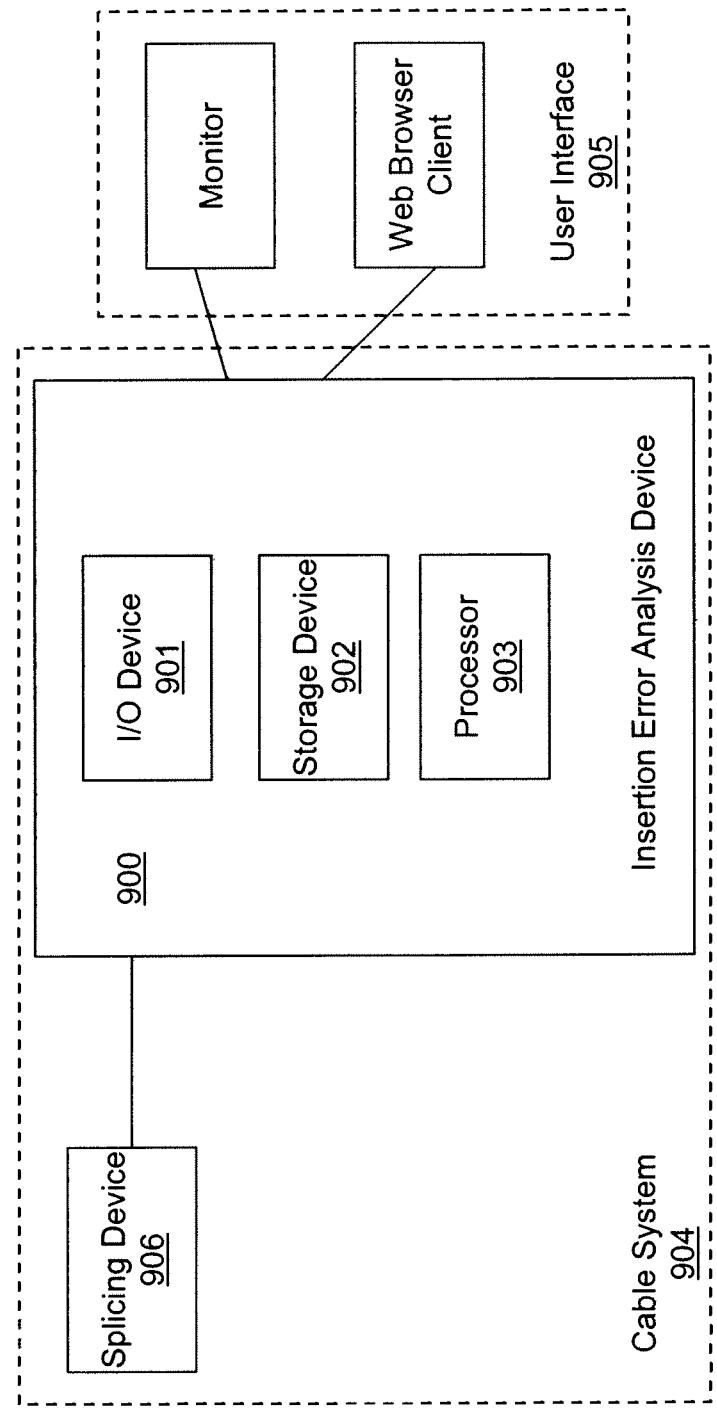
FIG. 9 shows an example system for insertion analysis.

An example system implementing an insertion analysis tool 900 is illustrated in FIG. 9. As shown, such an example system may be located within a 905 cable television system, or other system which provisions video. Such a system may include an I/O device 901 which may be in communication with a video source, for instance, in the example the system is connected to a splicing device 906 which may provide video to the system. Example systems may also include a storage device 902 which may be capable of storing relevant video and other material, e.g., signals from the cable system that content should be inserted. Example systems may also include one or more processors 903. Such processors may generate a condensed representation of the video, as described above. Alternatively, example systems may receive a condensed representation as an input to the system. In example systems, the processor 903 may be configured to facilitate the analysis of insertion errors described more fully above. In addition, example systems may provide user interfaces 905. For example, example systems may allow users to access the services provided by the system using a web browser. Such users may then be able to access the analysis tools described above, and other useful tools. For example, users may be able to choose video segments to analyze, may manage the recording of video segments, may view video segments and condensed representations of those segments, may perform analysis of those segments, and may view statistical analyses such as the graph presented in FIG. 7.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It will further be appreciated that the above-described methods and procedures may be provided using the systems disclosed herein, or on other types of systems. The methods and procedures, unless expressly limited, are not intended to be read to require particular actors or systems performing particular elements of the claimed methods.

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed:

1. A video insertion accuracy system comprising:
   an input device configured to receive video comprising inserted content and a content insertion signal;
   a storage device, in communication with the input device, configured to automatically record the received video and the received content insertion signal;
   at least one processor to execute one or more programming instructions for transforming the video, wherein the programming instructions cause the at least one processor to:
      for each frame of the video, create a first representation, reduced in a first dimension, wherein a visual property of each pixel of the first representation is assigned by aggregating a visual property of a plurality of pixels of the frame having a corresponding position in the unreduced dimension, wherein the first dimension comprises at least one of the horizontal rows and the vertical columns; and
      form a condensed visual representation comprising the first representation of each frame aligned along the first dimension according to an order of the plurality of frames in the video; and
   a display device configured to display the condensed visual representation, and an intended insertion point indicated by the content insertion signal.

2. The system of claim 1, further comprising an interface device configured to receive a user indication of a location in the condensed visual representation, wherein the display device is further configured to display a frame from the video associated with the identified location.

3. The system of claim 1, wherein the display device is further configured to display a frame from the video associated with an identified location and display a predetermined number of additional frames surrounding the frame in the video.

4. The system of claim 3, wherein the display device is further configured to display an insertion error calculated from the intended insertion point and an actual insertion point identified based on the condensed visual representation.

5. The system of claim 4, wherein the display device is further configured to display insertion error statistics.

6. The system of claim 1, wherein one or more additional programming instructions cause the at least one processor to track insertion errors over time.

7. The system of claim 1, wherein one or more additional programming instructions cause the at least one processor to determine at least one insertion error.

8. A method comprising:
   receiving video comprising inserted content and a content insertion signal;
   recording the received video and the received content insertion signal;
   for each frame of the video, creating a first representation, reduced in a first dimension, wherein a visual property of each pixel of the first representation is assigned by aggregating a visual property of a plurality of pixels of the frame having a corresponding position in the unreduced dimension, wherein the first dimension comprises at least one of the horizontal rows and the vertical columns;
   forming a condensed visual representation comprising the first representation of each frame aligned along the first dimension according to an order of the plurality of frames in the video; and
   displaying the condensed visual representation and an intended insertion point indicated by the content insertion signal.

9. The method of claim 8, further comprising:
   receiving a user indication of a location in the condensed visual representation; and
   displaying a frame from the video associated with the identified location.

10. The method of claim 8, further comprising:
    displaying a frame from the video associated with an identified location; and
    displaying a predetermined number of additional frames surrounding the frame in the video.

11. The method of claim 10, further comprising:
    determining an actual insertion point based on the condensed visual representation; and
    calculating an insertion error based on a difference between the intended insertion point and the actual insertion point.

12. The method of claim 11, further comprising:
displaying the insertion error.

13. The method of claim 11, further comprising:
calculating one or more insertion errors; and
displaying insertion error statistics corresponding to the one or more insertion errors.

14. The method of claim 8, further comprising:
tracking insertion errors over time.

15. A non-transitory computer readable storage medium comprising a plurality of computer-executable instructions, which, when executed by at least one processor, cause the at least one processor to:
receive video comprising inserted content and a content insertion signal;
record the received video and the received content insertion signal;
for each frame of the video, create a first representation, reduced in a first dimension, wherein a visual property of each pixel of the first representation is assigned by aggregating a visual property of a plurality of pixels of the frame having a corresponding position in the unreduced dimension, wherein the first dimension comprises at least one of the horizontal rows and the vertical columns;
form a condensed visual representation comprising the first representation of each frame aligned along the first dimension according to an order of the plurality of frames in the video; and
display the condensed visual representation and an intended insertion point indicated by the content insertion signal.

16. The computer readable storage medium of claim 15, further comprising one or more computer-executable instructions that, when executed, cause the at least one processor to:
receive a user indication of a location in the condensed visual representation; and
display a frame from the video associated with the identified location.

17. The computer readable storage medium of claim 15, further comprising one or more computer-executable instructions that, when executed, cause the at least one processor to:
display a frame from the video associated with an identified location; and
display a predetermined number of additional frames surrounding the frame in the video.

18. The computer readable storage medium of claim 17, further comprising one or more computer-executable instructions that, when executed, cause the at least one processor to:
determine an actual insertion point based on the condensed visual representation; and
calculate an insertion error based on a difference between the intended insertion point and the actual insertion point.

19. The computer readable storage medium of claim 18, further comprising one or more computer-executable instructions that, when executed, cause the at least one processor to:
display the insertion error.

20. The computer readable storage medium of claim 15, further comprising one or more computer-executable instructions that, when executed, cause the at least one processor to:
track insertion errors over time.

* * * * *